March 6, 1951     F. J. ALLGEO     2,544,438
PENDULUM LEVEL WITH TRANSPARENT INDICATORS
Filed Sept. 15, 1947
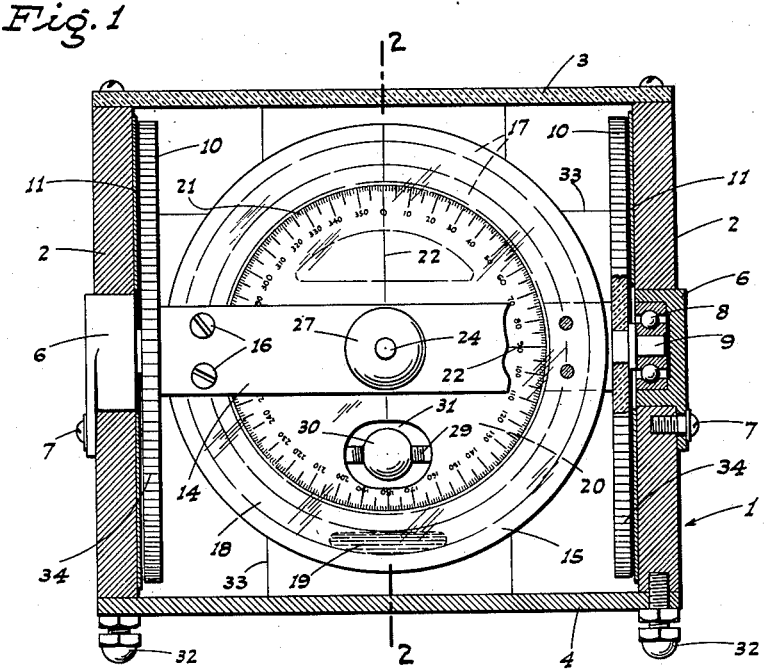
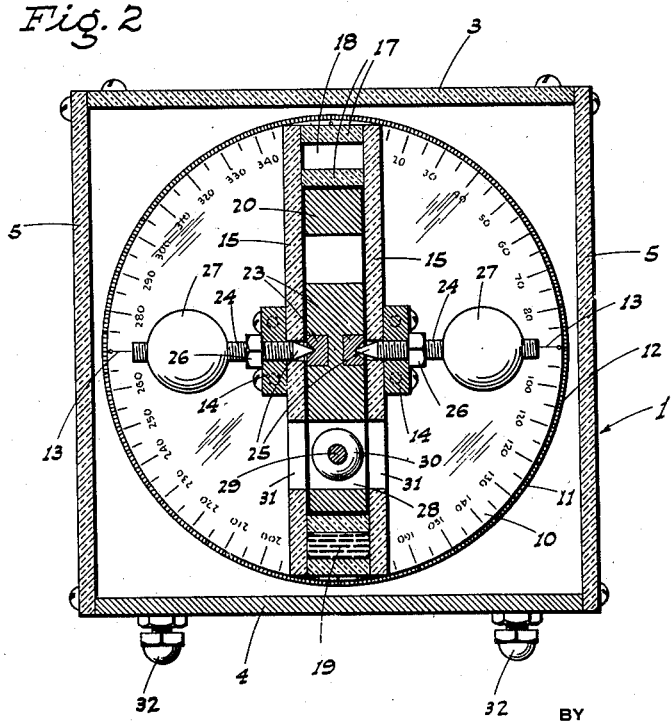
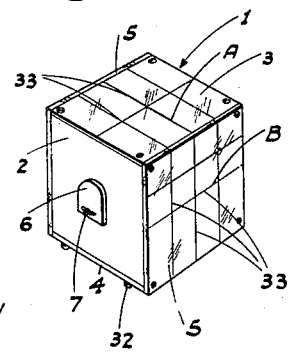
INVENTOR
Fred J. Allgeo
ATTORNEYS Patented Mar. 6, 1951

2,544,438

UNITED STATES PATENT OFFICE 2,544,438

PENDULUM LEVEL WITH TRANSPARENT INDICATORS

Fred J. Allgeo, San Francisco, Calif., assignor of one-half to Stefan Johnson, San Francisco, Calif.

Application September 15, 1947, Serial No. 774,085

2 Claims. (Cl. 33—215)

The present invention has for one object the provision of a novel, gravity actuated level operative to simultaneously indicate deviations in planes at right angles to each other, either horizontally or perpendicularly.

Another object of the invention is to provide a gravity actuated level, of the type described, which is arranged to read through a full 360° scale in each plane of inclination.

A further object of the invention is to provide a level, as above, which is adaptable to many uses, such as commercial, aeronautical, maritime, or military; the design and construction of the device being such that it is readily mounted in position for use, easy to read, and extremely accurate.

An additional object of this invention is the provision of a gravity actuated level which is sturdy and weather-proof.

A further object of the invention is to provide a simple and inexpensive level, and yet one which will be exceedingly effective for the purpose for which it is designed.

These objects are accomplished by means of such structure and relative arrangement of parts as will fully appear by a perusal of the following specification and claims.

In the drawings:

Fig. 1 is a sectional elevation of the device.

Fig. 2 is a cross sectional elevation on line 2—2 of Fig. 1.

Fig. 3 is a perspective view, reduced, of the housing.

Referring now more particularly to the characters of reference on the drawings, the improved level comprises a rectangular housing, indicated generally at 1, which housing comprises a pair of substantially square end-heads 2 disposed in spaced-apart facing relation. The end-heads 2 are connected together, to form the housing, by a top plate 3, a bottom plate 4, and side plates 5; at least the top and side plates being transparent for the purpose of permitting of ready and easy reading of the level mechanism mounted within the housing, which mechanism comprises:

The end heads 2 are fitted, centrally thereof, with bearing cups 6 removably mounted by screws 7; said cups each carrying a bearing 8. Axially alined spindles 9 are journaled in corresponding ones of the bearings 8 and project into the housing a short distance.

The spindles 9 are fixed, at their inner ends, to the center of rotary discs 10 in the housing running in closely adjacent but spaced relation to dials 11 fixed on the inner face of the end-heads 2 concentric to said spindles 9. The dials 11, on their outer face, are formed with a 360° scale or calibration 12, while the rotary discs 10 are of transparent material and are scribed with cross-hairs 13 which read on the 360° scale 12.

The transparent, rotary discs 10 are connected together, for rotation in unitary relation, by means of a pair of bars 14 fixed, and extending between, said discs 10 parallel to, but on opposite sides of, an axial line extending between the spindles 9.

A pair of transparent discs 15 are disposed between the bars 14 in spaced facing relation to each other, and said bars 14 are each affixed diametrically to the corresponding one of the transparent discs 15, by means of screws 16.

The transparent discs 15 are of a diameter which closely approaches the diameter of the rotary discs 10, but as mounted are at right angles to the latter and symmetrical to the axis of the same.

A pair of concentric but spaced-apart rings 17 are fixed between the discs 15 adjacent the periphery thereof, whereby to form an annular channel 18 between said rings; the rings 17 and channel 18 having an axis co-extensive with the axis of the discs 15.

A quantity of mercury 19 is disposed in the annular channel 18; such mercury providing the pendulum effect for the rotary discs 10 which read on the scales 12 of the fixed dials 11.

Within the confines of the innermost ring 17, the device is fitted with a rotary pendulum 20 formed on opposite sides with matching 360° scales 21, and cross-hairs 22 on the transparent discs 15 read on corresponding ones of the scales 21. The rotary pendulum 20 is fitted, centrally thereof, with bearing seats 23, and spindles 24 threadingly engage through the bars 14 in alined relation and provide needle bearings 25 working in the seats 23 in supporting relation to the rotary pendulum 20. The spindles 24 are adjustably maintained in correct setting by lock nuts 26; said spindles 24 extending axially outwardly beyond said lock nuts 26, and there carrying balancing balls 27 in threaded-on and consequently adjustable relation.

As the spindles 24 are alined and extend axially of the assembly of the transparent discs 15 and concentric rings 17, said balancing balls 27 may be manipulated to adjust the proper position of the pendulum made up of the members 14, 15, 17 and 19.

The rotary pendulum 20, which is preferably partly cut away in the upper half, as shown, is formed below its axis, or in the lower half, with a cavity 28 having a threaded rod 29 extending thereacross parallel to the axis of the spindles 9. An adjustment or balancing ball 30 is threaded on rod 29; adjustment of said ball providing the means for initial accurate setting of the crosshairs 22 of each disc 15 in neutral or zero position with respect to the corresponding 360° scale 21. Access to the ball 30 for adjusting it is had through either one or the other of the discs 15 by means of ports 31 in said discs.

At the bottom and adjacent the corners the housing 1 is fitted with vertically adjustable feet 32 whereby the device may be leveled. Thereafter, with the housing suitably engaged with a support whose inclination is to be ascertained, either vertically or perpendicularly, the described level will provide simultaneous and easy readings of the inclination in right-angle planes. The degree of inclination in one plane is ascertained by reading the cross hairs of either rotary disc 10 on the corresponding fixed dial 11, while the degree of inclination in a plane at a right angle to said one plane is ascertained by reading the cross hairs 22 of one disc 15 on the corresponding scale 21 of the rotary pendulum 20.

It is thus possible to obtain accurate simultaneous readings in right angle planes; this being very advantageous for many purposes to which the device may be put.

The described device is relatively simple and inexpensive in its structure; and yet provides a practical, convenient, and easy-to-read instrumentality.

The transparent top plate 3, and side plates 5, are each provided with a number of cross hairs 33. The central cross hair A on the top plate 3 registers to right or left of the transverse axis of the interior unit, while the horizontal cross hairs B of the side plates 5 register above and below the longitudinal axis of the unit, and can be read on peripheral degree markings 34 on the end discs 10. By reading any given set or sets of the cross hairs 33 simultaneously on adjacent cross hairs 22 and the corresponding scale 21, therefore, the device has high accuracy, and in addition the exact angular positions of the housing, relative to a true level, are determinable as is especially desirable for aircraft or gunnery adaptations.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A level comprising a pair of spaced apart supports, a calibrated dial on the inner face of each support, a pair of spaced apart bars pivoted at their ends in the supports co-axially of the dials, a transparent disc on each end of the bars, each disc overlying the dial on one of the supports, a radial hair line scribed on each transparent disc in front of the adjacent dial, a pair of spaced apart transparent discs fixed to the bars with the axes of such last named discs disposed transversely of the longitudinal axis of the bars, a cylindrical pendulum pivoted between the discs co-axially therewith, a calibrated scale on each face of the pendulum, and a hair line scribed on each of said last named discs in front of the scale on the adjacent face of the pendulum.

2. A level as in claim 1 in which the pendulum is provided with a transversely disposed cutout cavity below its central axis, a threaded pin disposed across the cavity, a ball threaded for adjustment along the threaded pin, each disc being provided with an open port adjacent the ball.

FRED J. ALLGEO.

REFERENCES CITED

The following references are of record in the file of this patent:

UNITED STATES PATENTS

| Number | Name | Date |
| --- | --- | --- |
| 268,826 | Robertson | Dec. 12, 1882 |
| 603,368 | Vredenburgh et al. | May 3, 1898 |
| 1,258,597 | Mladinich | Mar. 15, 1918 |
| 1,288,579 | Hawley | Dec. 24, 1918 |
| 1,308,795 | McCormack | July 8, 1919 |
| 1,310,444 | Rohm | July 22, 1919 |
| 1,359,474 | Wernick | Nov. 16, 1920 |
| 1,426,645 | Hornbeck | Aug. 22, 1922 |
| 1,433,513 | Luce | Oct. 24, 1922 |
| 1,440,275 | Cerveny | Dec. 26, 1922 |
| 2,189,516 | Fujimoto | Feb. 6, 1940 |
| 2,384,586 | Allgeo | Sept. 11, 1945 |

FOREIGN PATENTS

| Number | Country | Date |
| --- | --- | --- |
| 13,828 | Great Britain | 1914 |
| 77,672 | Germany | 1894 |
| 152,819 | Great Britain | 1920 |